US012629831B2

(12) United States Patent
Wang

(10) Patent No.: US 12,629,831 B2
(45) Date of Patent: May 19, 2026

(54) METHOD AND APPARATUS FOR GENERATING MOTION TRAJECTORY, ROBOT, ELECTRONIC DEVICE AND STORAGE MEDIUM

(71) Applicant: Beijing Xiaomi Robot Technology Co., Ltd., Beijing (CN)

(72) Inventor: Jiajun Wang, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 8 days.

(21) Appl. No.: 18/649,503

(22) Filed: Apr. 29, 2024

(65) Prior Publication Data

US 2025/0135642 A1 May 1, 2025

(30) Foreign Application Priority Data

Oct. 31, 2023 (CN) .......................... 202311437442.8

(51) Int. Cl.
B25J 9/16 (2006.01)
G05D 1/646 (2024.01)

(52) U.S. Cl.
CPC ............ B25J 9/1664 (2013.01); G05D 1/646 (2024.01)

(58) Field of Classification Search
CPC ....... B25J 9/1664; B25J 9/0006; G05D 1/646; B62D 57/032; G05B 2219/40264
See application file for complete search history.

(56) References Cited

U.S. PATENT DOCUMENTS

| 2024/0269846 A1* | 8/2024 | Wang | .......................... B25J 9/16 |
| 2025/0178190 A1* | 6/2025 | Deits | ...................... B25J 9/1664 |

FOREIGN PATENT DOCUMENTS

| CN | 106406098 | A | 2/2017 |
| CN | 111558941 | A | 8/2020 |
| CN | 111730605 | A | 10/2020 |
| CN | 112051741 | A | 12/2020 |
| CN | 116945151 | A | 10/2023 |
| KR | 20080109379 | A | 12/2008 |
| WO | 2022161315 | A1 | 8/2022 |

OTHER PUBLICATIONS

Chen, H., et al., "A Swing-foot Trajectory Generation Method for Biped Walking," 2021 6th IEEE International Conference on Advanced Robotics and Mechatronics (ICARM), Chongqing, China, (2021).
Yu, H., et al., "Hierarchical jumping optimization for hydraulic biped wheel-legged robots," Control Engineering Practice, vol. 141, (2023).

* cited by examiner

*Primary Examiner* — Dylan M Katz
(74) *Attorney, Agent, or Firm* — Volpe Koenig

(57) ABSTRACT
A method for generating motion trajectory includes: constructing a first joint model of a robot, where the quantity of dimensions of the first joint model is smaller than the quantity of dimensions of a full-dimensional joint model of the robot; determining an action sequence of a target motion based on the first joint model, where the action sequence includes a plurality of action stages and switching events between the adjacent action stages; and determining a trajectory of the target motion according to the action sequence.

18 Claims, 5 Drawing Sheets

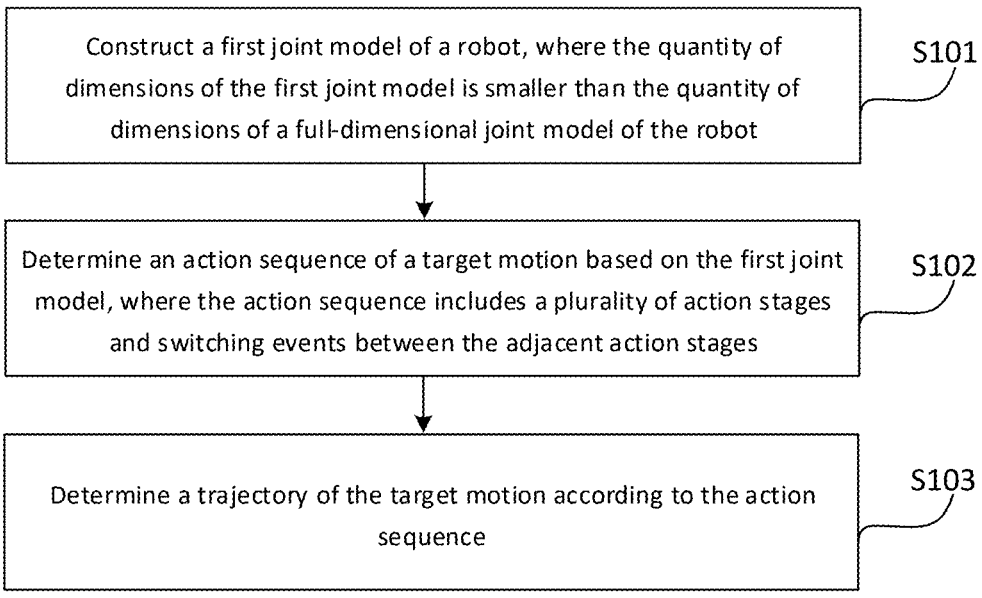

Construct a first joint model of a robot, where the quantity of dimensions of the first joint model is smaller than the quantity of dimensions of a full-dimensional joint model of the robot    S101

Determine an action sequence of a target motion based on the first joint model, where the action sequence includes a plurality of action stages and switching events between the adjacent action stages    S102

Determine a trajectory of the target motion according to the action sequence    S103

Figure 1

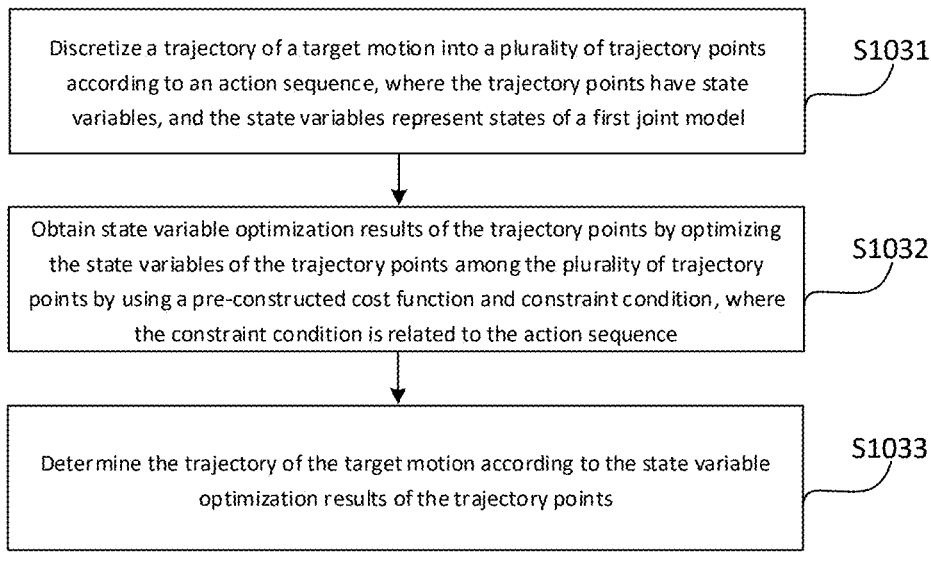

Discretize a trajectory of a target motion into a plurality of trajectory points according to an action sequence, where the trajectory points have state variables, and the state variables represent states of a first joint model — S1031

Obtain state variable optimization results of the trajectory points by optimizing the state variables of the trajectory points among the plurality of trajectory points by using a pre-constructed cost function and constraint condition, where the constraint condition is related to the action sequence — S1032

Determine the trajectory of the target motion according to the state variable optimization results of the trajectory points — S1033

Figure 5

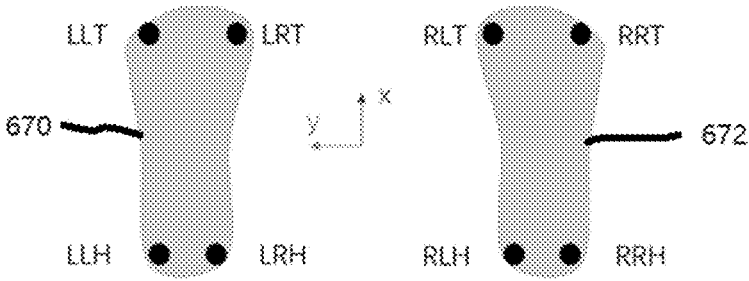

Figure 6

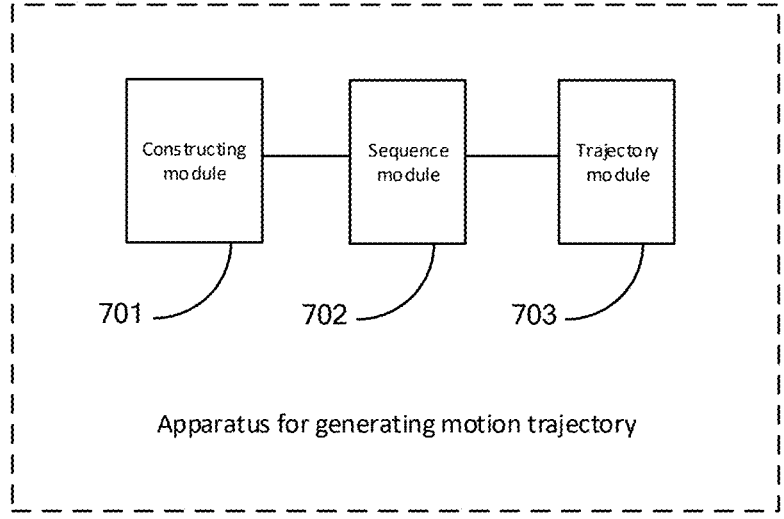

Apparatus for generating motion trajectory

Figure 7

METHOD AND APPARATUS FOR GENERATING MOTION TRAJECTORY, ROBOT, ELECTRONIC DEVICE AND STORAGE MEDIUM

CROSS-REFERENCE TO RELATED APPLICATIONS

The present application claims the benefit of priority to Chinese Application No. 202311437442.8, filed on Oct. 31, 2023, the contents of which are incorporated herein by reference in their entirety.

BACKGROUND OF THE INVENTION

In recent years, robot technologies have been continuously developed and have become increasingly intelligent and automated, with varying degrees of improvement in richness, stability, and flexibility of actions. Robots can perform specific tasks in place of users in their production and daily life, bringing convenience to the users.

SUMMARY OF THE INVENTION

The disclosure relates to the technical field of robots, in particular to a method and an apparatus for generating motion trajectory, a robot, an electronic device, and a storage medium.

According to a first aspect of an example of the disclosure, a method for generating motion trajectory is provided, and includes:

constructing a first joint model of a robot, where the quantity of dimensions of the first joint model is smaller than the quantity of dimensions of a full-dimensional joint model of the robot;

determining an action sequence of a target motion based on the first joint model, where the action sequence includes a plurality of action stages and switching events between the adjacent action stages; and determining a trajectory of the target motion according to the action sequence.

According to a second aspect of an example of the disclosure, a robot is provided. The robot includes a memory and a processor. The memory is configured to store computer instructions capable of being run on the processor, and the processor is configured to implement, when executing the computer instructions, any of the methods herein.

According to a third aspect of an example of the disclosure, an electronic device is provided. The electronic device includes a memory and a processor. The memory is configured to store computer instructions capable of being run on the processor, and the processor is configured to implement, when executing the computer instructions, the method for generating motion trajectory described in the first aspect.

According to a fourth aspect of an example of the disclosure, a non-transitory computer-readable storage medium is provided, on which a computer program is stored. The program, when executed by a processor, implements the method described in the first aspect.

BRIEF DESCRIPTION OF DRAWINGS

The accompanying drawings here, which are incorporated in and constitute a part of this specification, illustrate examples consistent with the disclosure and together with the specification, serve to explain the principles of the disclosure.

FIG. 1 is a flow diagram of a method for generating motion trajectory shown by an example of the disclosure.

FIG. 5 is a flow diagram of a method for generating motion trajectory shown by an example of the disclosure.

FIG. 6 is a schematic diagram of a distribution of contact points shown by an example of the disclosure.

FIG. 7 is a schematic structural diagram of an apparatus for generating motion trajectory shown by an example of the disclosure.

DETAILED DESCRIPTION OF THE INVENTION

Figure 2:
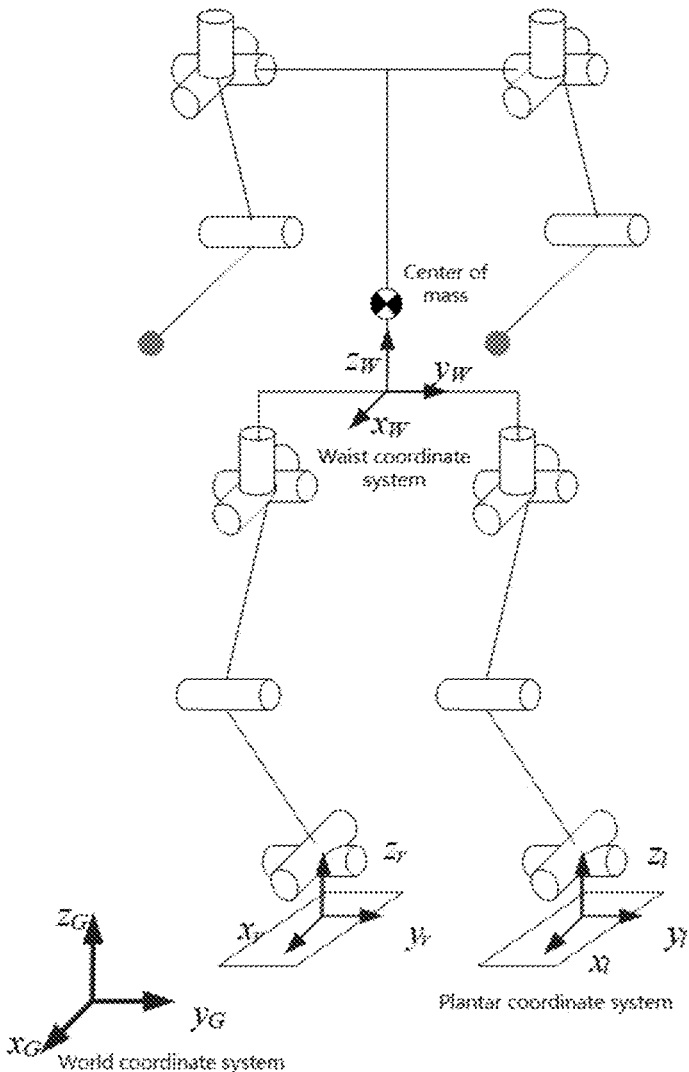
FIG. 2 is a schematic structural diagram of a biped robot shown by an example of the disclosure.

Examples will be illustrated in detail here, instances of which are represented in accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of an apparatus and a method consistent with some aspects of the disclosure as detailed in the appended claims.

The terms used in the disclosure are merely for the purpose of describing the particular examples, and are not intended to limit the disclosure. The singular forms "a", "the", and "this" used in the disclosure and the appended claims are also intended to include the plural forms as well, unless the context clearly indicates otherwise. It needs to be further understood that the term "and/or" used here refers to and contains any or all possible combinations of one or more associated listed items.

It needs to be understood that the terms "first", "second", "third", and the like may be employed in the disclosure to describe various information, but these pieces of information should not be limited to these terms. These terms are merely used to distinguish the same type of information from one another. For example, in a case of not departing from the scope of the disclosure, first information may also be called second information, and similarly, the second information may also be called the first information. Depending on the context, the word "if" as used here may be interpreted as "at the time of" or "when" or "in response to determining".

In recent years, technologies have been continuously developed and have become increasingly intelligent and automated, with varying degrees of improvement in richness, stability, and flexibility of actions. Robots can perform specific tasks in place of users in agricultural and industrial scenarios, bringing convenience. In the related art, the robots may achieve different motions by performing different motion trajectories. However, due to the relatively simple motion trajectory, the actions that robots can achieve are relatively simple, which means that the robots cannot perform more complex actions yet.

To solve the problem existing in the related art, an example of the disclosure provides a method and an apparatus for generating motion trajectory, a robot, an electronic device, and a storage medium, so as to overcome defects in the related art.

Based on this, in a first aspect, at least one example of the disclosure provides a method for generating motion trajectory. Please refer to FIG. 1, which shows depicts a method, including steps S101 to S103.

This method may be applied to a robot, for example, applied to a legged robot such as a biped robot (a humanoid robot) and a quadruped robot (such as a robotic dog). Please refer to FIG. 2, which shows a degree of freedom structure of the robot by taking the biped robot as an example. The biped robot includes two upper limbs and two lower limbs. Shoulders of the upper limbs have three degrees of freedom in pitch, roll, and yaw directions, elbows have one degree of freedom in a pitch direction, and wrists may also have two or three degrees of freedom. Hips of the lower limbs have three degrees of freedom in the pitch, roll, and yaw directions, knees have one degree of freedom in the pitch direction, ankles have two degrees of freedom in the pitch and roll directions, where the roll, the pitch, and the yaw are respectively directions rotating around an X axis, a Y axis and a Z axis. Ends of the lower limbs have two flat feet, and by changing a contact state between the flat feet and the outside world, various dynamic behaviors may be achieved, such as walking, running, jumping, somersaults, and stable operation. There may be a plurality of contact points between the flat feet (i.e., the robot) and a ground, such as at least two contact points of a toe and a heel.

In step S101, a first joint model of a robot is constructed, where the quantity of dimensions of the first joint model is smaller than the quantity of dimensions of a full-dimensional joint model of the robot.

For example, the first joint model is obtained by eliminating a non-motion dimension from the full-dimensional joint model of the robot, where a motion dimension is a dimension with a motion existing in the target motion. Taking a robot shown in FIG. 2 as an example, its full-dimensional joint model includes an X-axis dimension, a Y-axis dimension, and a Z-axis dimension. The X-axis dimension represents front and back directions of the robot, the Y-axis dimension represents left and right dimensions of the robot, and the Z-axis dimension represents up and down directions of the robot. In response to determining that the target motion has motions on the X-axis dimension and the Z-axis dimension, but has no motion on the Y-axis dimension, the first joint model as shown in FIG. 3 may be obtained by eliminating the Y-axis dimension. This model merely has the X-axis dimension and the Z-axis dimension, that is, the model is a multi-link model in an XZ plane, including a body 310, thighs 312, shanks 314, feet 316 comprising heels 316*a* and toes 316*b*, upper arms 318, and forearms 320. The body is its floating base, with three degrees of freedom: moving along the X axis, moving along the Z axis, and rotating around the Y axis (a pitch angle). The first joint model has two contact points of the toe and heel with the ground. It can be seen from this that a position vector of the first joint model is:

$$q = [q_b, q_j]^T = [q_1, \ldots, q_{n_g}]^T = [x, y, \theta, q_4, \ldots, q_8]^T$$

In the above formula, $q_b=[q_1, q_2, q_3]^T=[x, y, \theta]^T$ is a pose of the floating base in a coordinate system I, where $\theta$ is the pitch angle of the floating base. $q_j=[q_4, \ldots, q_8]^T$ is a position of each joint (i.e., a joint angle).

Furthermore, a dynamic equation of the first joint model may be written as:

$$M(q)\ddot{q} + b(q, \dot{q}) = S_\tau^T \tau + J_c^T(q)f_c$$

where, M and b respectively represent an inertia matrix and a nonlinear term (representation of Coriolis force, centrifugal force, and gravity in a generalized coordinate space); $\tau=[\tau_4, \tau_5, \tau_6, \tau_7, \tau_8]^T$ is a torque vector of each joint, and $S_\tau=[0_{n_\tau \times (n_v-n_\tau)}, I_{n_\tau \times n_\tau}]$ is a selection matrix of a drivable joint; $J_c$ is a velocity Jacobian matrix of the contact point, $f_c=[f_{toe,x}, f_{toe,z}, f_{heel,x}, f_{heel,z}]^T$ is an external force impressed on each contact point, $\dot{q}$ is a velocity vector, and $\ddot{q}$ is an acceleration vector.

In step S102, an action sequence of a target motion is determined based on the first joint model, where the action sequence includes a plurality of action stages and switching events between the adjacent action stages.

The target motion may be a highly dynamic behavior. During the high dynamic motion, the contact between the robot and the outside world often varies at different stages, which is reflected in changes in the number of contact points and a contact mode. A process of establishing the contact is complete plastic impact, and a process of separating the contact is inviscid separation. Thus, the following mapping relationships exist respectively in the processes of establishing the contact and separating the contact:

$$\begin{cases} q^+ = q^-, \dot{q}^+ = \dot{q}^- & \text{(Contact separation process)} \\ q^+ = q^-, \dot{q}^+ = \Delta(q)\dot{q}^- & \text{(Contact establishment process)} \end{cases}$$

where, $\Delta(q)=(I-M^{-1}J_c^T(J_cM^{-1}J_c^T)^{-1}J_c)$.

Based on this, for example, this step may determine, according to the target motion, an event that a contact state between at least one contact point of the first joint model and a ground changes as a switching event, and determine a motion between the adjacent switching events as an action stage, where each action stage is described using a dynamic equation, that is, the different action stages are described using the different dynamic equations.

In response to determining that the contact state between at least one contact point of the first joint model and the ground changes, then a contact state (contact or non-contact) between the first joint model and the ground changes. For example, the contact state between the first joint model and the ground is obtained by performing arrangement and combination of contact or not-contact of each contact point with the ground, that is, when the first joint model has n contact points with the ground, the first joint model has 2n contact states with the ground. Taking the biped robot shown in FIG. 2 as an example, four contact states as shown in Table 1 below may be determined according to the contact states between the toe as well as the heel and the ground:

| phase_num | phase_name | contact_flag | |
| | | toe | heel |
|---|---|---|---|
| 0 | flight | 0 | 0 |
| 1 | toe-contact | 1 | 0 |
| 2 | heel-contact | 0 | 1 |
| 3 | foot-contact | 1 | 1 |

In the above table, phase_num is a serial number of a phase, phase_name is a name of the phase, and contact_flag is a contact flag, including whether each contact point is in contact with the ground, 1 represents contact with the ground, and 0 represents not contact with the ground.

Figure 3:
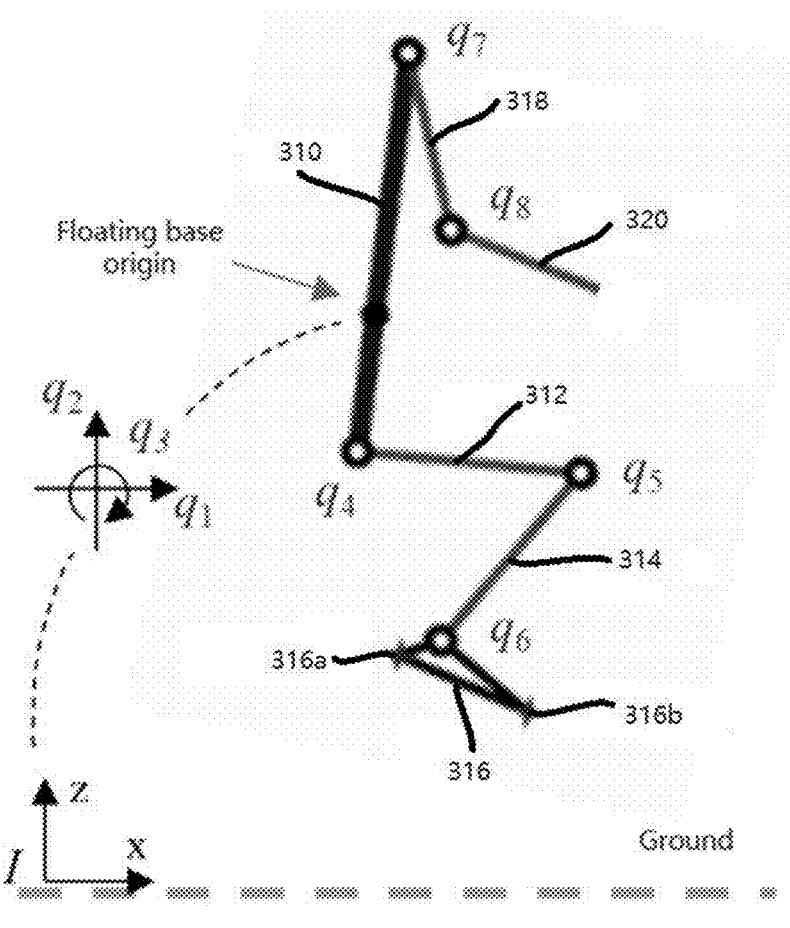
FIG. 3 is a schematic structural diagram of a first joint model shown by an example of the disclosure.
Figure 4:
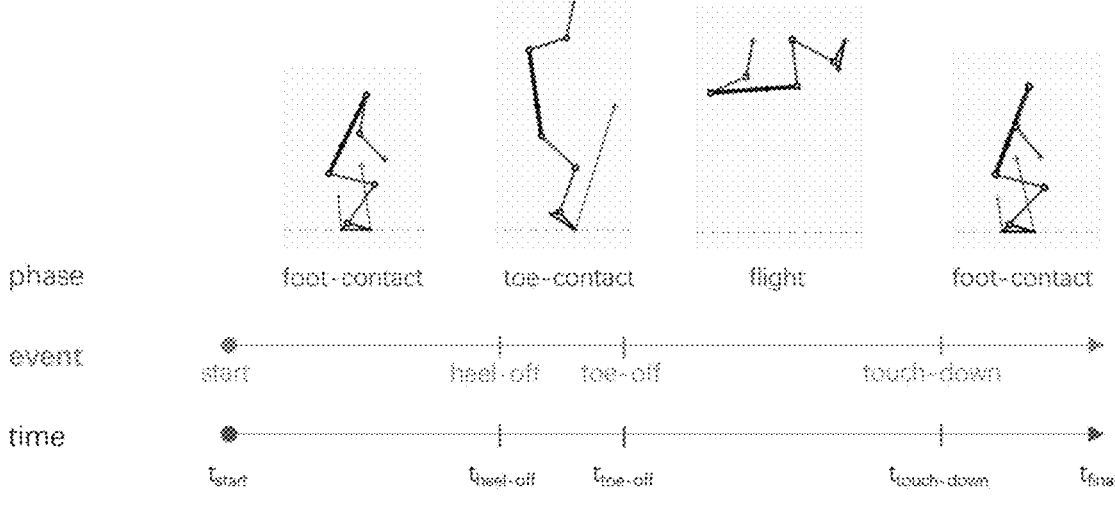
FIG. 4 is a schematic diagram of an action sequence shown by an example of the disclosure.

Taking the biped robot shown in FIG. 2 as an example, if an action sequence of a somersault motion is determined for the biped robot, an action sequence shown in FIG. 4 may be obtained. The action sequence includes four action stages: foot-contact, toe-contact, flight, and foot-contact, as well as a heel-off switching event between the foot-contact and the toe-contact, a toe-off switching event between the toe-contact and the flight, and a touch-down switching event between the flight and the foot-contact.

In step S103, a trajectory of the target motion is determined according to the action sequence.

As an example, this step may be executed in a mode shown in FIG. 5, including sub-step S1031 to sub-step S1033.

In sub-step S1031, the trajectory of the target motion is discretized into a plurality of trajectory points according to the action sequence, where the trajectory points have state variables, and the state variables represent states of the first joint model.

In some examples, the trajectory of the target motion is discretized according to a time of each action in the action sequence and preset frequency, so that a trajectory point is formed on each frequency point.

In some examples, the state variables may include at least one of: a position vector, a velocity vector, an acceleration vector, a contact point vector, or a torque vector, where the position vector includes a floating base position and a position of (each) joint, the velocity vector includes a velocity of (each) joint, the acceleration vector includes an acceleration of (each) joint, the contact point vector includes an external force impressed on (each) contact point, and the torque vector includes joint torque of (each) joint. For example, the state variables X are as shown in the following formula:

$$X = \{\ddot{q}[k], \dot{q}[k], q[k], f_c[k], \tau[k]\}, \text{ for all } k=1, \ldots, N$$

In the above formula, k is one of N trajectory points (knot nodes) obtained by discretizing the motion trajectory, i is one of the $n_c$ contact points, c is a two-dimensional matrix of $n_c \times N$, each column corresponds to one trajectory point, and each column includes a contact point vector on the corresponding trajectory point. $\ddot{q}[k]$ is an acceleration vector for a $k^{th}$ trajectory point, $\dot{q}[k]$ is a velocity vector for the $k^{th}$ trajectory point, q[k] is a position vector for the $k^{th}$ trajectory point, $f_c[k]$ is a contact point vector for the $k^{th}$ trajectory point, and $\tau[k]$ is a torque vector for the $k^{th}$ trajectory point.

In sub-step 1032, state variable optimization results of the trajectory points are obtained by optimizing the state variables of the trajectory points among the plurality of trajectory points by using a pre-constructed cost function and constraint condition, where the constraint condition is related to the action sequence.

For example, the cost function is related to at least one of:

an error between a position vector of at least one of the plurality of trajectory points and an expected state of the target motion, where the position vector includes a floating base position and a joint position; or joint torque of at least one of the plurality of trajectory points.

For example, the cost function includes squares of errors between the position vector of a last trajectory point and the expected state of the target motion, as well as a sum of squares of joint torque of each trajectory point among the plurality of trajectory points, where the position vector includes the floating base position and the position of each joint. That is, the cost function is as shown in the following formula:

$$\min_x \left\{ \left\| q[N] - q^{ref}[N] \right\|_{w_1}^2 + \sum_{k=1}^N \|\tau[k]\|_{w_2}^2 \right\}$$

In the above equation, $q^{ref}[N]$ is the expected state of the target motion, and $W_1$ and $W_2$ are weight values respectively.

For example, the constraint condition includes at least one of:

first item: a state variable of a first trajectory point being consistent with a specified state of the target motion, that is:

$$q[1] = q^{ref}[1], \dot{q}[1] = \dot{q}^{ref}[1]$$

In the above equation, $q^{ref}[1]$ is a specified position vector of the target motion, and $\dot{q}^{ref}[1]$ is a specified velocity vector of the target motion.

Second item: the state variable of each trajectory point conforming to a dynamic equation of the first joint model, that is:

$$\text{for each knot node } k = 1, \ldots, N:$$
$$M(q[k])\ddot{q}[k] + b(q[k], \dot{q}[k]) = S_\tau^T \tau[k] + J_c^T (q[k]) f_c[k]$$

Parameters in the above formula have been detailed in the dynamic equation section of the first joint model introduced earlier, and will not be repeated here.

Third item: the state variables of the adjacent trajectory points meeting integral continuity, that is:

$$\dot{q}[k+1] = \dot{q}[k] + \ddot{q}[k]\Delta t$$
$$q[k+1] = q[k] + \dot{q}[k]\Delta t + \frac{1}{2}\ddot{q}[k]\Delta t$$

In the above formula, $\dot{q}[k+1]$ is a velocity vector of a $(k+1)^{th}$ trajectory point, q[k+1] is a position vector of the $(k+1)^{th}$ trajectory point, and $\Delta t$ is a difference between the adjacent trajectory points.

Fourth item: a state variable of the trajectory point with a contact state with a ground switching from not-contact to contact meeting discrete dynamic mapping of the first joint model, that is:

$$\text{if touchdown occurs at } k:$$
$$\dot{q}[k+1] = \Delta(q[k+1]) \cdot \dot{q}[k+1]$$
$$\text{end}$$

Parameters in the above formula are introduced in detail when introducing the mapping relationships that exist in the process of establishing the contact, and will not be repeated here.

Fifth item: the state variable of each trajectory point conforming to a joint limit condition, that is:

$$q^{min} \leq q[k] \leq q^{max} \qquad 5$$

$$\|\dot{q}[k]\| \leq \dot{q}^{max}, \|\ddot{q}[k]\| \leq \ddot{q}^{max}, \|\tau[k]\| \leq \tau^{max}$$

$q^{min}$ and $q^{max}$ are lower and upper limits that can be achieved for a joint position, $\dot{q}^{max}$ is a maximum value that can be achieved for a joint velocity, $\ddot{q}^{max}$ is a maximum value that can be achieved for a joint acceleration, and $\tau^{max}$ is a maximum value that can be achieved for joint torque.

Sixth item: a contact point with the contact state with the ground being contact having no relative motion with the ground, having a support force between the contact point and the ground being not less than 0, and having a friction force between the contact point and the ground being not greater than a maximum static sliding friction force, that is:

$$\text{foreach contact point } i = 1,...,n_c :$$
$$\quad \text{if } c_{i,k} ==1:$$
$$\qquad J_c(q[k])\dot{q}[k] = 0$$
$$\qquad f_{c,z} [k] \geq 0$$
$$\qquad \|f_{c,x} [k]\| \leq \mu f_{c,z} [k]$$
$$\quad \text{else}$$
$$\qquad f_c [k] = 0$$
$$\quad \text{end}$$

In the above formula, $c_{i,k}$ is a contact state of an $i^{th}$ contact point of the $k^{th}$ trajectory point, where 1 represents contact and 0 represents not-contact; $f_{c,z}[k]$ is a support force between the contact point in the $k^{th}$ trajectory point and the ground, $f_{c,x}[k]$ is a friction force between the contact point in the $k^{th}$ trajectory point and the ground, and $f_c[k]$ is a tangential force between the contact point in the $k^{th}$ trajectory point and the ground.

In sub-step S1033, the trajectory of the target motion is determined according to the state variable optimization results of the trajectory points (preferably the state variable optimization result of each trajectory point).

For example, this step is executed in the following modes:

first, a trajectory of the first joint model performing the target motion is determined according to the state variable optimization results of the trajectory points.

Then, a trajectory of the robot performing the target motion is obtained by performing dimension restoration on the trajectory of the first joint model performing the target motion.

Taking the biped robot shown in FIG. 2 as an example, the trajectory X of the first joint model may be restored to a trajectory Y of the biped robot in a full degree of freedom space (Y has N columns in total, and each column corresponds to one trajectory point):

$$Y = \left[Q, \dot{Q}, T, F_c\right]^T \qquad 65$$

-continued $$\begin{cases} Q = \begin{bmatrix} q_1, 0, q_2, 0, q_3, 0, 0, 0, q_4, q_5, q_6, 0, 0, \\ 0, q_4, q_5, q_6, 0, q_7, 0, 0, q_8, q_7, 0, 0, q_8 \end{bmatrix}^T \\ \dot{Q} = \begin{bmatrix} \dot{q}_1, 0, \dot{q}_2, 0, \dot{q}_3, 0, 0, 0, \dot{q}_4, \dot{q}_5, \dot{q}_6, 0, 0, \\ 0, \dot{q}_4, \dot{q}_5, \dot{q}_6, 0, \dot{q}_7, 0, 0, \dot{q}_8, \dot{q}_7, 0, 0, \dot{q}_8 \end{bmatrix}^T \\ T = \begin{bmatrix} 0, 0, \dfrac{\tau_4}{2}, \dfrac{\tau_5}{2}, \dfrac{\tau_6}{2}, 0, 0, 0, \dfrac{\tau_4}{2}, \dfrac{\tau_5}{2}, \\ \dfrac{\tau_6}{2}, 0, \dfrac{\tau_7}{2}, 0, 0, \dfrac{\tau_8}{2}, \dfrac{\tau_7}{2}, 0, 0, \dfrac{\tau_8}{2} \end{bmatrix}^T \\ F_c = [F_{toe}, F_{toe}, F_{heel}, F_{heel}, F_{toe}, F_{toe}, F_{heel}, F_{heel}]^T, \\ F_{toe} = \left[\dfrac{f_{toe,x}}{4}, 0, \dfrac{f_{toe,z}}{4}\right]^T, F_{heel} = \left[\dfrac{f_{heel,x}}{4}, 0, \dfrac{f_{heel,z}}{4}\right]^T \end{cases}$$

In the above formula, $Q=[Q_b, Q_{left-leg}, Q_{right-leg}, Q_{left-arm}, Q_{right-arm}]^T$ is a position vector of the biped robot, $\dot{Q}$ is a velocity vector of the biped robot, $T=[T_{left-leg}, T_{right-leg}, T_{left-arm}, T_{right-arm}]^T$ is a torque vector of the biped robot, and $F_c=[F_{LLT}, F_{LRT}, F_{LLH}, F_{LRH}, F_{RLT}, F_{RRT}, E_{RLH}, E_{RRH}]^T$ is a 24-dimensional contact point vector, and sequentially represents the external forces impressed on the 8 contact points of the left and right feet.

Please refer to FIG. 6, the 8 contact points of the left feet 670 and right feet 672 are [LLT, LRT, LLH, LRH, RLT, RRT, RLH, RRH] respectively. The first letter represents the left foot (L) and the right foot (R), the second letter represents the left side (L) and the right side (R) of the foot, and the third letter represents the toe and the heel of the foot.

The method for generating motion trajectory provided by the example of the disclosure constructs the first joint model of the robot, determines the action sequence of the target motion based on the first joint model, and finally may determine the trajectory of the target motion according to the action sequence. Due to the fact that the action sequence is determined based on the first joint model with a lower dimension than the full-dimensional joint model of the robot, the difficulty of determining the motion trajectory is greatly reduced, the success rate of trajectory determination is increased, and the efficiency of trajectory determination is improved. That is, more complex motion trajectories can be generated by using this method, enabling the robot to achieve more complex motions.

Specifically, the first joint model constructed in the example of the disclosure is a six-link model on a plane (ignoring a waist degree of freedom) or a seven-link model (considering the waist degree of freedom), which greatly reduces the complexity of dynamic calculations without ignoring motion components of the target motion and thus improves the optimization efficiency of dynamic variables.

Moreover, the example of the disclosure obtains the plurality of contact states between the robot and the outside world by combining the contact states of the plurality of contact points, which enables the determination of the action sequence to be more vivid and closely related to the details of the target motion, and thus the trajectory determined based on the action sequence is more accurate. For example, in the related art, the contact state between feet of the robot and the ground can merely be contact or not-contact, while in the example of the disclosure, the two contact points of the toe and heel make the contact state between the feet and the ground in four contact states: full contact, full not-contact, merely toe contact, and merely heel contact. It may be understood that if the robot has more contact points, more contact states between the robot and the ground can be obtained through a combination.

It needs to be noted that the ground referred to in the above example of the disclosure refers to all contact objects that the robot passes through during its walking process, such as a table top (i.e., the contact object when the robot walks on the table top).

An illustrative application scene of the method for generating motion trajectory provided by the disclosure is described below. A user may control a motion of a robot through user equipment. For example, the user equipment may include, but is not limited to electronic devices such as a smartphone, a smart wearable device, a tablet, a touch screen, and the like. The user may implement a control operation for the robot through the user equipment, e.g., by inputting the target motion. The user equipment, in response to the user's control operation, sends a corresponding control command to the robot, e.g., a control command for indicating the target motion. The robot may receive the control instruction sent by the user equipment via its own communication component. After receiving the control instruction, a processor within the robot may determine the target motion intended by the user based on the control instruction, and obtain the trajectory of the target motion according to the above steps S101 to S103. After obtaining the trajectory of the target motion, the processor within the robot may send corresponding drive instruction(s) to joint driver(s) of the robot according to the trajectory, so that the joint driver(s) may drive the joint(s) of the robot to perform motion according to the drive instruction(s), and the robot is enabled to accomplish the target motion intended by the user.

According to a second aspect of the example of the disclosure, an apparatus for generating motion trajectory is provided. Please refer to FIG. 7, and the apparatus includes:

a constructing module 701, configured to construct a first joint model of a robot, where the quantity of dimensions of the first joint model is smaller than the quantity of dimensions of a full-dimensional joint model of the robot;

a sequence module 702, configured to determine an action sequence of a target motion based on the first joint model, where the action sequence includes a plurality of action stages and switching events between the adjacent action stages; and a trajectory module 703, configured to determine a trajectory of the target motion according to the action sequence.

In one example of the disclosure, the determining module is configured to:

obtain the first joint model by eliminating a non-motion dimension from the full-dimensional joint model of the robot, where a motion dimension is a dimension with a motion existing in the target motion.

In one example of the disclosure, the sequence module is configured to:

determine, according to the target motion, an event that a contact state between at least one contact point of the first joint model and a ground changes as a switching event, and determine a motion between the adjacent switching events as an action stage.

In one example of the disclosure, the trajectory module is configured to:

discretize the trajectory of the target motion into a plurality of trajectory points according to the action sequence, where the trajectory points have state variables, and the state variables represent states of the first joint model;

obtain state variable optimization results of the trajectory points by optimizing the state variables of the trajectory points among the plurality of trajectory points by using a pre-constructed cost function and constraint condition, where the constraint condition is related to the action sequence; and determine the trajectory of the target motion according to the state variable optimization results of the trajectory points.

In one example of the disclosure, the cost function is related to at least one of:

an error between a position vector of at least one of the plurality of trajectory points and an expected state of the target motion, where the position vector includes a floating base position and a joint position; or joint torque of at least one of the plurality of trajectory points.

In one example of the disclosure, the constraint condition includes at least one of:

a state variable of a first trajectory point being consistent with a specified state of the target motion;

a state variable of each trajectory point conforming to a dynamic equation of the first joint model;

state variables of the adjacent trajectory points meeting integral continuity;

a state variable of a trajectory point with a contact state with a ground switching from not-contact to contact meeting discrete dynamic mapping of the first joint model;

the state variable of each trajectory point conforming to a joint limit condition; or a contact point with the contact state with the ground being contact having no relative motion with the ground, having a support force between the contact point and the ground being not less than 0, and having a friction force between the contact point and the ground being not greater than a maximum static sliding friction force.

In one example of the disclosure, the robot has a plurality of contact points with the ground, and the first joint model has at least two contact points of a toe and a heel with the ground.

In one example of the disclosure, when being configured to determine the trajectory of the target motion according to the state variable optimization results of the trajectory points, the trajectory module is configured to:

determine a trajectory of the first joint model performing the target motion according to the state variable optimization results of the trajectory points; and obtain a trajectory of the robot performing the target motion by performing dimension restoration on the trajectory of the first joint model performing the target motion.

In one example of the disclosure, the state variables include at least one of: a position vector, a velocity vector, an acceleration vector, a contact point vector, or a torque vector, where the position vector includes a floating base position and a joint position, the velocity vector includes a joint velocity, the acceleration vector includes a joint acceleration, the contact point vector includes an external force impressed on a contact point, and the torque vector includes joint torque of a joint.

Figure 8:
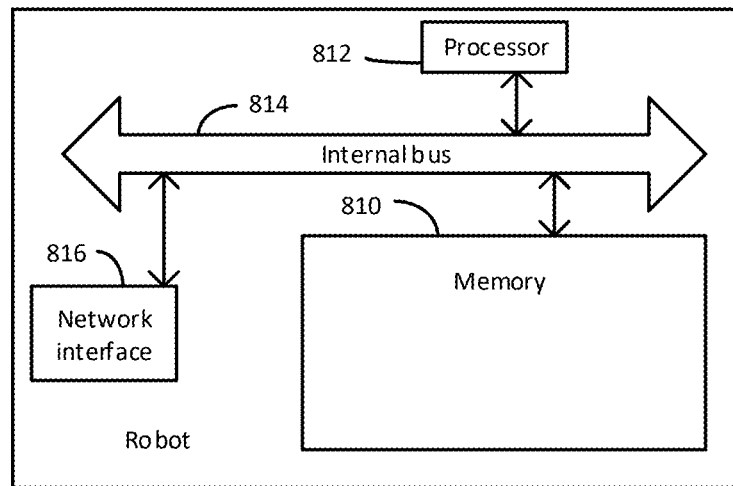
FIG. 8 is a structural block diagram of a robot shown by an example of the disclosure.

In a third aspect, at least one example of the disclosure provides a robot. Please refer to FIG. 8, which shows the structure of the robot. The robot includes a memory 810 and a processor 812, the memory is configured to store computer instructions capable of being run on the processor, and the processor is configured to generate a motion trajectory based on the method described in any one in the first aspect when executing the computer instructions. That is, the robot can generate the motion trajectory online or offline. The robot also includes an internal bus 814 and a network interface 816.

Figure 9:
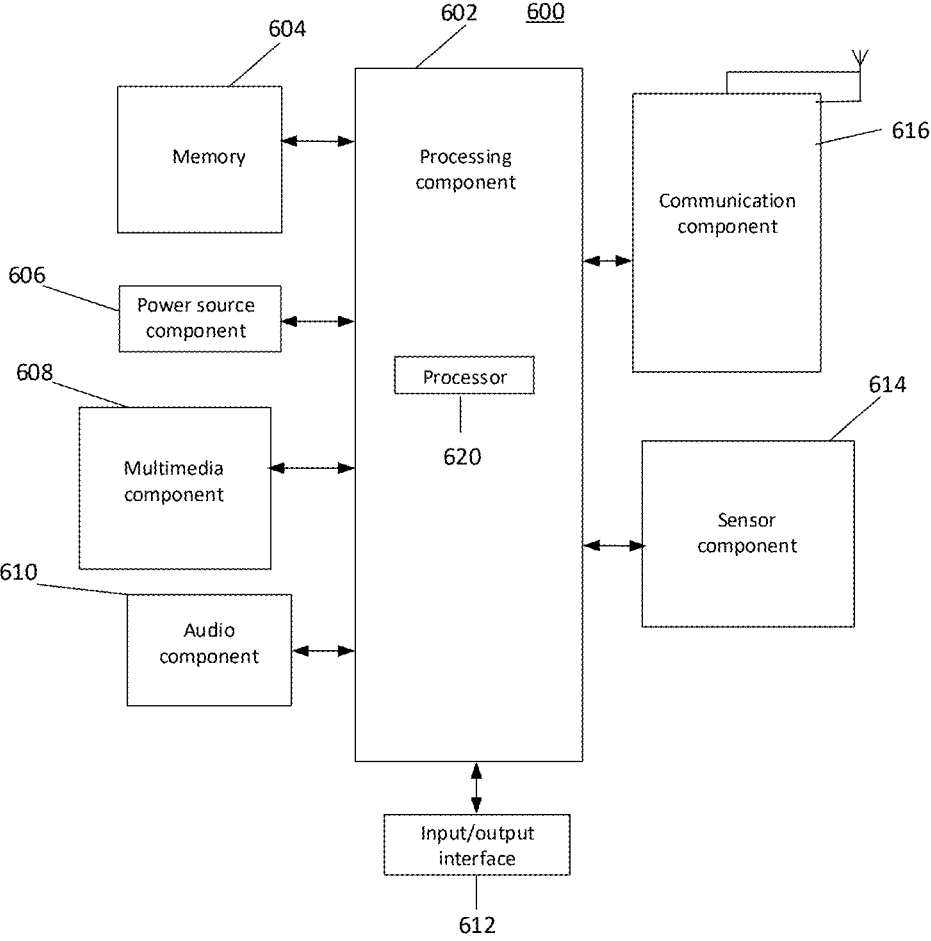
FIG. 9 is a structural block diagram of an electronic device shown by an example of the disclosure.

According to a fourth aspect of an example of the disclosure, please refer to FIG. 9, which shows a block diagram of an electronic device as an example. For example, the electronic device 600 may be a mobile telephone, a computer, a digital broadcast terminal, a message transceiving device, a game console, a tablet device, a medical device, a fitness device, a personal digital assistant, and the like.

Referring to FIG. 9, the electronic device 600 may include one or more of the following components: a processing component 602, a memory 604, a power source component 606, a multimedia component 608, an audio component 610, an input/output (I/O) interface 612, a sensor component 614, and a communication component 616.

The processing component 602 usually controls overall operation of the electronic device 600, such as operations associated with display, telephone calling, data communication, a camera operation and a record operation. The processing component 602 may include one or more processors 620 to execute an instruction, so as to complete all or part of the steps of the above method. In addition, the processing component 602 may include one or more modules, so as to facilitate interaction between the processing component 602 and other components. For example, the processing component 602 may include a multimedia module, so as to facilitate interaction between the multimedia component 608 and the processing component 602.

The memory 604 is configured to store various types of data so as to support operations on the apparatus 600. Examples of these data include instructions of any application programs or methods configured to be operated on the electronic device 600, contact data, telephone directory data, messages, pictures, videos, and the like. The memory 604 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power source component 606 provides electric power for various components of the electronic device 600. The power source component 606 may include a power management system, one or more power sources, and other components associated with generating, managing, and distributing electric power for the electronic device 600.

The multimedia component 608 includes a screen providing an output interface between the electronic device 600 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping, and gestures on the touch panel. The touch sensor may not only sense a boundary of a touching or swiping action, but also detect duration and pressure related to the touching or swiping operation. In some examples, the multimedia component 608 includes a front camera and/or a back camera. When the electronic device 600 is in an operation mode, such as a shooting mode or a video mode, the front camera and/or the back camera may receive external multimedia data. Each front camera and each back camera may be a fixed optical lens system or have a focal length and optical zooming capability.

The audio component 610 is configured to output and/or input an audio signal. For example, the audio component 610 includes a microphone (MIC). When the electronic device 600 is in the operation mode, such as a call mode, a recording mode or a speech recognition mode, the microphone is configured to receive an external audio signal. The received audio signal may be further stored in the memory 604 or sent via the communication component 616. In some examples, the audio component 610 further includes a speaker for outputting the audio signal.

The I/O interface 612 provides an interface between the processing component 602 and a peripheral interface module, and the above peripheral interface module may be a keyboard, a click wheel, buttons, etc. These buttons may include, but are not limited to, a home button, a volume button, a start button, and a lock button.

The sensor component 614 includes one or more sensors for providing state evaluations of all aspects for the electronic device 600. For example, the sensor component 614 may detect a start/shutdown state of the electronic device 600 and relative positioning of components, for example, the components are a display and a keypad of the electronic device 600. The sensor component 614 may further detect position change of the electronic device 600 or one component of the electronic device 600, whether there is contact between the user and the electronic device 600, azimuth or acceleration/deceleration of the electronic device 600, and temperature change of the electronic device 600. The sensor component 614 may further include a proximity sensor, which is configured to detect existence of a nearby object without any physical contact. The sensor component 614 may further include an optical sensor, such as a CMOS or CCD image sensor, for use in an imaging application. In some examples, the sensor component 614 may further include an acceleration sensor, a gyroscope sensor, a magnetic sensor, a pressure sensor or a temperature sensor.

The communication component 616 is configured to facilitate wired or wireless communication between the electronic device 600 and other devices. The electronic device 600 may access a wireless network based on a communication standard, such as WiFi, 2G or 3G, 4G or 5G, or their combination. In an example, the communication component 616 receives a broadcast signal or broadcast related information from an external broadcast management system via a broadcast channel. In an example, the communication component 616 further includes a near-field communication (NFC) module so as to facilitate short-range communication. For example, the NFC module may be implemented based on a radio frequency identification (RFID) technology, an infrared data association (IrDA) technology, an ultra-wide band (UWB) technology, a Bluetooth (BT) technology, and other technologies.

In the example, the electronic device 600 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic components for executing the above method for generating motion trajectory of the electronic device.

In a fifth aspect, the disclosure further provides a non-transitory computer-readable storage medium including instructions, in an example, such as a memory 604 including instructions. The above instructions may be executed by a processor 620 of an electronic device 600 so as to complete the above method for generating motion trajectory of the electronic device. For example, the non-transitory computer-readable storage medium may be an ROM, a random access memory (RAM), a CD-ROM, a magnetic tape, a floppy disk, an optical data storage device and the like.

Those skilled in the art will easily figure out other implementation solutions of the disclosure after considering the specification and practicing the disclosure disclosed here. The present disclosure intends to cover any transformation, usage, or adaptive change of the disclosure, and these transformations, usages, or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claims.

It is to be understood that the disclosure is not limited to the exact structure that has been described above and shown in the accompanying drawings, and that various modifications and changes may be made without departing from the scope of the disclosure. The scope of the disclosure is limited merely by the appended claims.

The invention claimed is:

1. A method for generating motion trajectory, comprising:
constructing a first joint model of a robot, wherein a quantity of dimensions of the first joint model is smaller than a quantity of dimensions of a full-dimensional joint model of the robot;
determining an action sequence of a target motion based on the first joint model, wherein the action sequence comprises a plurality of action stages and switching events between adjacent action stages; and
determining a trajectory of the target motion according to the action sequence;
wherein determining the action sequence of the target motion based on the first joint model comprises:
determining, according to the target motion, an event that a contact state between at least one contact point of the first joint model and a ground changes as a switching event, and determining a motion between the adjacent switching events as an action stage.

2. The method for generating motion trajectory according to claim 1, wherein constructing the first joint model of the robot comprises:
obtaining the first joint model by eliminating a non-motion dimension from the full-dimensional joint model of the robot, wherein a motion dimension is a dimension with a motion existing in the target motion.

3. The method for generating motion trajectory according to claim 1, wherein determining the trajectory of the target motion according to the action sequence comprises:
discretizing the trajectory of the target motion into a plurality of trajectory points according to the action sequence, wherein the trajectory points have state variables, and the state variables represent states of the first joint model;
obtaining state variable optimization results of the trajectory points by optimizing the state variables of the trajectory points among the plurality of trajectory points by using a pre-constructed cost function and constraint condition, wherein the constraint condition is related to the action sequence; and
determining the trajectory of the target motion according to the state variable optimization results of the trajectory points.

4. The method for generating motion trajectory according to claim 3, wherein the cost function is related to at least one of:

an error between a position vector of at least one of the plurality of trajectory points and an expected state of the target motion, wherein the position vector comprises a floating base position and a joint position; or
joint torque of at least one of the plurality of trajectory points.

5. The method for generating motion trajectory according to claim 3, wherein the constraint condition comprises at least one of:
a state variable of a first trajectory point being consistent with a specified state of the target motion;
a state variable of each trajectory point conforming to a dynamic equation of the first joint model;
state variables of adjacent trajectory points meeting integral continuity;
a state variable of a trajectory point with a contact state with a ground switching from not-contact to contact meeting discrete dynamic mapping of the first joint model;
the state variable of each trajectory point conforming to a joint limit condition; or
a contact point with the contact state with the ground being contact having no relative motion with the ground, having a support force between the contact point and the ground being not less than 0, and having a friction force between the contact point and the ground being not greater than a maximum static sliding friction force.

6. The method for generating motion trajectory according to claim 1, wherein the robot has a plurality of contact points with the ground, and the first joint model has at least two contact points of a toe and a heel with the ground.

7. The method for generating motion trajectory according to claim 3, wherein determining the trajectory of the target motion according to the state variable optimization results of the trajectory points comprises:
determining a trajectory of the first joint model performing the target motion according to the state variable optimization results of the trajectory points; and
obtaining a trajectory of the robot performing the target motion by performing dimension restoration on the trajectory of the first joint model performing the target motion.

8. The method for generating motion trajectory according to claim 3, wherein the state variables comprise at least one of: a position vector, a velocity vector, an acceleration vector, a contact point vector, or a torque vector, wherein the position vector comprises a floating base position and a joint position, the velocity vector comprises a joint velocity, the acceleration vector comprises a joint acceleration, the contact point vector comprises an external force impressed on a contact point, and the torque vector comprises joint torque of a joint.

9. A robot, comprising a memory and a processor, wherein the memory is configured to store computer instructions capable of being run on the processor, and when executing the computer instructions, the processor is configured to:
construct a first joint model of a robot, wherein a quantity of dimensions of the first joint model is smaller than a quantity of dimensions of a full-dimensional joint model of the robot;
determine an action sequence of a target motion based on the first joint model, wherein the action sequence comprises a plurality of action stages and switching events between adjacent action stages; and
determine a trajectory of the target motion according to the action sequence;

wherein the processor, when executing the computer instructions, is further configured to:

determine, according to the target motion, an event that a contact state between at least one contact point of the first joint model and a ground changes as a switching event, and determine a motion between the adjacent switching events as an action stage.

10. The robot according to claim 9, wherein the processor is further configured to:

obtain the first joint model by eliminating a non-motion dimension from the full-dimensional joint model of the robot, wherein a motion dimension is a dimension with a motion existing in the target motion.

11. The robot according to claim 9, wherein the processor is further configured to:

discretize the trajectory of the target motion into a plurality of trajectory points according to the action sequence, wherein the trajectory points have state variables, and the state variables represent states of the first joint model;

obtain state variable optimization results of the trajectory points by optimizing the state variables of the trajectory points among the plurality of trajectory points by using a pre-constructed cost function and constraint condition, wherein the constraint condition is related to the action sequence; and determine the trajectory of the target motion according to the state variable optimization results of the trajectory points.

12. The robot according to claim 11, wherein the cost function is related to at least one of:

an error between a position vector of at least one of the plurality of trajectory points and an expected state of the target motion, wherein the position vector comprises a floating base position and a joint position; or joint torque of at least one of the plurality of trajectory points.

13. The robot according to claim 11, wherein the constraint condition comprises at least one of:

a state variable of a first trajectory point being consistent with a specified state of the target motion;

a state variable of each trajectory point conforming to a dynamic equation of the first joint model;

state variables of adjacent trajectory points meeting integral continuity;

a state variable of a trajectory point with a contact state with a ground switching from not-contact to contact meeting discrete dynamic mapping of the first joint model;

the state variable of each trajectory point conforming to a joint limit condition; or a contact point with the contact state with the ground being contact having no relative motion with the ground, having a support force between the contact point and the ground being not less than 0, and having a friction force between the contact point and the ground being not greater than a maximum static sliding friction force.

14. The robot according to claim 9, wherein the robot has a plurality of contact points with the ground, and the first joint model has at least two contact points of a toe and a heel with the ground.

15. The robot according to claim 11, wherein the processor is further configured to:

determine a trajectory of the first joint model performing the target motion according to the state variable optimization results of the trajectory points; and obtain a trajectory of the robot performing the target motion by performing dimension restoration on the trajectory of the first joint model performing the target motion.

16. The robot according to claim 11, wherein the state variables comprise at least one of: a position vector, a velocity vector, an acceleration vector, a contact point vector, or a torque vector, wherein the position vector comprises a floating base position and a joint position, the velocity vector comprises a joint velocity, the acceleration vector comprises a joint acceleration, the contact point vector comprises an external force impressed on a contact point, and the torque vector comprises joint torque of a joint.

17. An electronic device, comprising a memory and a processor, wherein the memory is configured to store computer instructions capable of being run on the processor, and when executing the computer instructions, the processor is configured to:

construct a first joint model of a robot, wherein a quantity of dimensions of the first joint model is smaller than a quantity of dimensions of a full-dimensional joint model of the robot;

determine an action sequence of a target motion based on the first joint model, wherein the action sequence comprises a plurality of action stages and switching events between adjacent action stages; and determine a trajectory of the target motion according to the action sequence;

wherein the processor, when executing the computer instructions, is further configured to:

determine, according to the target motion, an event that a contact state between at least one contact point of the first joint model and a ground changes as a switching event, and determine a motion between the adjacent switching events as an action stage.

18. A non-transitory computer-readable storage medium, on which a computer program is stored, wherein the program, when executed by a processor, implements the method according to claim 1.

* * * * *